Aug. 31, 1937.  I. C. MATTHEWS  2,091,714
PROTECTIVE BACKING FOR REFLECTING SURFACES
Filed May 10, 1934
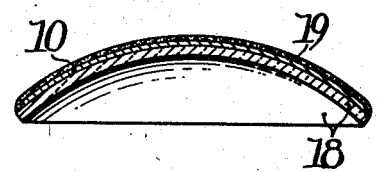
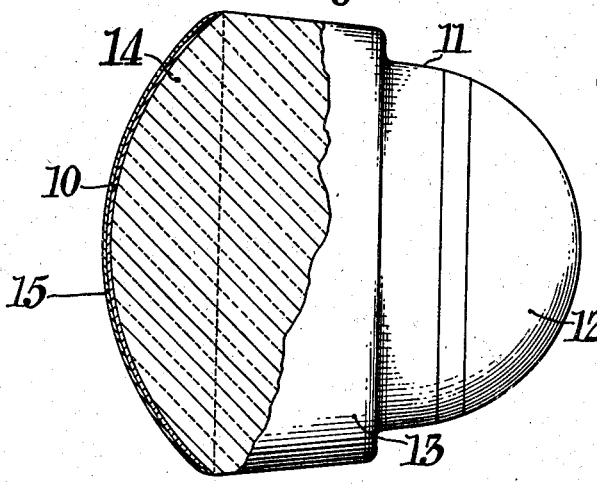
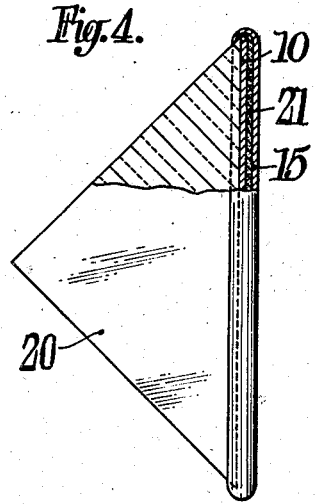
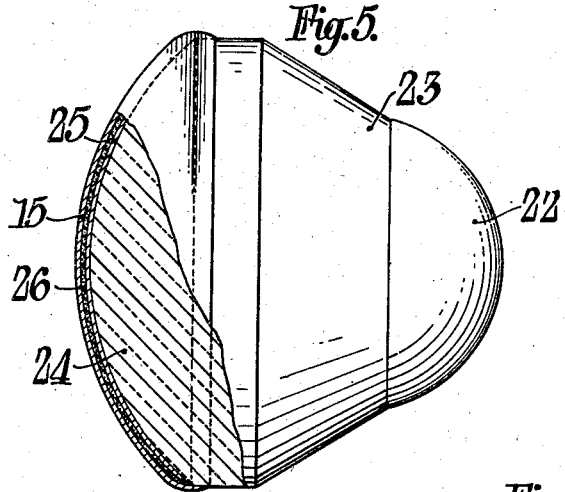
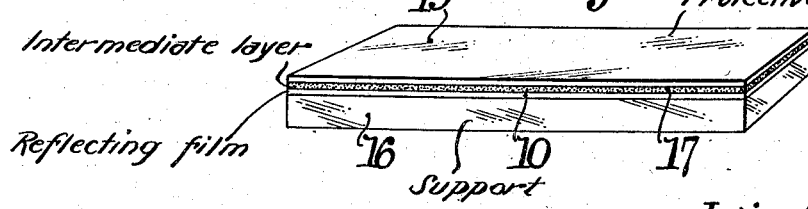
Inventor:
Irving C. Matthews,
By Newton M. Perrins
George A. Gillette, Jr.
Attorneys Patented Aug. 31, 1937

2,091,714

UNITED STATES PATENT OFFICE 2,091,714

PROTECTIVE BACKING FOR REFLECTING SURFACES

Irving C. Matthews, Rochester, N. Y., assignor, by mesne assignments, to Eastman Kodak Company, Jersey City, N. J., a corporation of New Jersey Application May 10, 1934, Serial No. 724,955

5 Claims. (Cl. 88—105)

The present invention relates to the manufacture of mirrors and more particularly to the provision of a protective backing which prevents deterioration or impairment of the reflecting surface of the mirror.

The initial formation of a metallic reflecting surface with good characteristics and high efficiency may be readily accomplished by any of the several procedures that are now well established. The preservation of the metallic reflecting surface in its original condition is a difficult problem which is rendered even more difficult when the mirror is subjected to the destructive action of changes in temperature and humidity, ultra-violet rays, gases, acids, alkaline solutions, etc.

The primary object of the present invention is the provision on a mirror of a protective backing to prevent deterioration of the metallic reflecting surface when the mirror is subjected to deleterious conditions.

Another object of the invention is the provision upon a mirror surface on a translucent support of a protective backing comprising depolymerized chlorinated rubber and which is particularly resistant to external weather conditions.

A further object is the provision of an intermediate layer or a protective coating for application to the metallic reflecting film of a mirror, which layer or coating consists of a comminuted filler imbedded in a support of depolymerized chlorinated rubber.

Still another object is the provision upon a metallic reflecting surface, first, of an intermediate layer composed of a granular filler imbedded in a waterproof supporting medium, and then of a protective coating consisting of rubber which has been depolymerized by chlorination.

A still further object of the invention is the provision of a protective backing for a reflecting film of a noble metal, which backing is so highly efficient that the metallic film may be comparatively thin without being susceptible to deterioration under the most adverse conditions whereby a considerable saving of noble metal is effected.

Other and further objects of the invention will be more apparent as the description thereof proceeds.

Reference is hereby made to the accompanying drawing wherein similar reference characters designate similar elements and wherein:

Fig. 1 is an elevation in partial section of a lens to which a metallic reflecting surface and a protective coating have been applied.

Fig. 2 is a perspective view of a glass plate having a metallic reflecting film which is covered by an intermediate layer and by a protective coating.

Fig. 3 is a section through a spherical mirror with a protective coating containing a granular filler.

Fig. 4 is an end view with a partial section through an optical prism with a reflecting surface which is covered by an intermediate layer containing a filler of powdered mineral and by a protective coating of depolymerized chlorinated rubber.

Fig. 5 is an elevation in partial section of a button type of lens which has a metallic reflecting surface, an intermediate layer of powdered copper imbedded in a supporting medium of shellac, and a protective coating of depolymerized chlorinated rubber.

The support for the metallic reflecting film 10 may have any shape or formation and may have one or more plane, spherical, or aspherical surfaces. Such a support may be composed of any suitable light transmitting or translucent medium, such as glass, quartz, mica, cellulose derivatives, etc., but glass is preferred.

The film 10 which constitutes the reflecting surface may be composed of any suitable metal or their alloys, such as the noble metals, nickel, aluminum, etc., although silver is preferred. Said metallic film 10 is applied to a predetermined surface of the support by any of the recognized procedures, such as chemical deposition, hot spraying or sputtering. By way of example only, the chemical deposition of a silver reflecting film according to the Brashear process will be described.

A silver solution is prepared according to the following directions:

1. Dissolve 100 grams of silver nitrate in 2,000 c. c. of distilled water, and add ammonium hydroxide until the black precipitate that is first formed just dissolves.

2. Add a solution of 22.5 grams of sodium hydroxide in 300 c. c. of distilled water, and again just clear up the black precipitate with ammonium hydroxide. If an excess of ammonium hydroxide has been added, add a dilute solution of silver nitrate until the solution is straw colored.

A reducing solution is prepared of the following ingredients:

| | Parts |
|---|---|
| Granulated sugar | 80 |
| Distilled water | 800 |
| C. P. nitric acid (Conc.) | 4 |
| Denatured alcohol | 80 |

This reducing solution is then heated to 80° C. (176° F.) and allowed to cool.

The working solution for silvering is composed of five parts of silver solution to one part of reducing solution and may be applied in any suitable manner, such as flowing, dipping or spraying. Whatever the manner of application the surface to be silvered must first be thoroughly cleaned and scrubbed to remove all grease and dirt. The working solution may be poured into a container which has a bottom formed by the surface to be silvered, may be flowed onto a plane surface which has been leveled, or may be sprayed onto the surface whether plane, spherical or aspherical. The preferred procedure, especially for spherical or aspherical surfaces, is by dipping whereby the supports for the mirror are fastened, as by clips, to flat trays which are inverted and lowered until the surface to be silvered is immersed in the working solution. A silver film of adequate thickness is deposited by immersion of the surfaces for eight to ten minutes.

The protective coating of the invention may be applied directly to the metallic reflecting film 10 but preferably an intermediate layer of a waterproof material containing a granular filler is interposed. The essence of the invention is the use, as the sole or principal ingredient of the protective coating, of rubber which has been depolymerized by chlorination.

In the treatment of rubber with chlorine gas, rubber hydrochloride may form and its presence in a protective coating is sometimes troublesome on account of the possibility of slow liberation of hydrochloric acid. This tendency to form the rubber hydrochloride is rendered very slight or nonexistent by carrying out the chlorination in the presence of any chlorinated solvent, such as carbon tetrachloride, at the boiling point of said solvent.

Depolymerized chlorinated rubber may be dissolved in suitable solvents, such as benzene, toluene, chlorinated hydrocarbons, tetralin, and drying oils. Linseed oil and wood oil are the most practical plasticizers, although amberol, coumarone-indene, certain resins, and ester and damar gums may be used to advantage. The selection and proportion of solvent and/or plasticizer used may be determined by experimentation and depends upon the desired viscosity of the solution and the required characteristics, such as hardness, flexibility, alkali resistance, water impermeability, adhesion, etc., of the dried coating. A 20% solution of depolymerized chlorinated rubber in toluene has a viscosity of 130 centipoises, is generally suitable for application by painting, spraying or dipping, and produces a dried coating which adequately resists the destructive action of all weather conditions.

The preferred mode of applying the solution of protective coating to the metallic film upon a support is to immerse or dip the film into the depolymerized chlorinated rubber solution. This practice permits the employment of a solution of somewhat lower viscosity and higher rubber content than that used for painting or spraying.

In Fig. 1, the support is a lens 11 of the button type which is used in roadside signs. Lens 11 has an aspherical portion 12, a conical body portion 13, and a spherical portion 14 to which the metallic reflecting film 10 is applied. According to this embodiment of the invention, the metallic film 10 is covered directly by a protective coating 15 of depolymerized chlorinated rubber.

A more durable mirror backing is obtained by interposing between the metallic reflecting film 10 and the protective coating 15 a layer of waterproof material in which particles of a granular filler are imbedded. This embodiment of the invention is illustrated in Fig. 2. In this instance the support is a glass plate 16 which is covered with a metallic reflecting film 10. An intermediate layer 17 is composed of a waterproof vehicle containing comminuted mineral and/or metallic filler, is applied directly to the metallic film 10, and is covered by a protective coating 15 of depolymerized chlorinated rubber.

Alternatively, the granular filler may be imbedded within the protective coating, see Fig. 3. The support may consist of a spherical shell 18 having a metallic reflecting film 10 to which a protective layer 19 is directly applied. The protective layer 19 is composed of depolymerized chlorinated rubber in which a mineral and/or a metallic powdered filler is imbedded.

Deterioration of the reflecting surface may be caused by corrosion due to electrolytic action between the metal, generally a noble metal, of the reflecting surface and a metallic filler in the protective backing because the metals generally used as fillers are higher in the electromotive series than the metals used for the reflecting surface. In order to escape this particular cause of deterioration of the reflecting surface, a mineral or non-metallic granular filler may be distributed throughout the protective layer 19 which is applied as an external coating, or may be distributed through the intermediate layer.

This last mentioned condition is illustrated in Fig. 4. An optical prism 20 has on one side a metallic reflecting film 10, an intermediate layer 21 which is preferably composed of depolymerized chlorinated rubber containing a powdered mineral or non-metallic filler, and a protective coating 15 also composed of depolymerized chlorinated rubber.

In spite of the possibility of electrolytic action between the metal of the reflecting surface and a metallic filler in a protective layer, metallic fillers have other well-recognized advantages which render their use desirable and preferable. The metallic filler is preferably composed of finely divided or powdered copper, although any metal, or any compound or alloy of a metal which is capable of being prepared in a degree of fineness equivalent to copper may be used, aluminum, nickel oxide, bronze, zinc, cadmium, and lead are suggested as alternates.

The preferred embodiment of the stratification of the mirror backing is shown in Fig. 5. The support is a button type of lens having a spherical front portion 22, a conical body portion 23, and a spherical back 24. A metallic silver layer 25 is applied by chemical deposition to the spherical surface of back 24.

An intermediate layer 26 is applied to the silver layer 25 and preferably comprises a supporting medium of shellac in which powdered copper is imbedded. The supporting medium may be composed of other suitable vehicles such as varnish, lacquer, paint, japan, or enamel, while other powdered metals, such as aluminum, nickel, oxide, bronze, zinc, or cadmium, may be imbedded in any of the supporting mediums mentioned.

Said intermediate layer 26 containing powdered copper may be applied, in a shellac solution of 18 parts of shellac to 4 parts of denatured alcohol, either by spraying, brushing or by dipping. At least two coats, with air drying between coats, of this powdered copper in shellac solution are applied to the metallic reflecting film. The outer or protective coating 15 of depolymerized chlorinated rubber is then applied over intermediate layer 26 either by dipping, spraying, or brushing and is allowed to air dry.

The edges of the stratified mirror backing are most susceptible to deterioration and for that reason the intermediate layer and/or the protective coating 15 should overlap the edges of the reflecting film 10, see Figs. 1, and 3 to 5.

The protective coating 15 and/or the intermediate layers 17, 21, and 26 may be applied interchangeably in any of the combinations disclosed to any of the types of support disclosed or to any type of support provided with a metallic reflecting film. Such variations or modifications of the invention are deemed to be written in the scope of the appended claims.

Having now particularly described my invention what I desire to secure by Letters Patent of the United States and what I claim is:—

1. A reflecting element comprising a support of light transmitting material, a metallic silver reflecting film on a portion of said support, and a protective coating composed of depolymerized chlorinated rubber, covering said reflecting film; and also covering the joint between said support and metallic reflecting film to prevent the entrance of deleterious elements therebetween.

2. A reflecting element comprising a support of light transmitting material, a metallic silver reflecting film on a portion of said support, and a protective coating composed of depolymerized chlorinated rubber, covering said metallic reflecting film, and also covering and sealing the seam between said support and metallic reflecting film to prevent the entrance of deleterious fluids from the atmosphere therebetween.

3. A reflecting element comprising a support of light transmitting material, a metallic silver reflecting film on a portion of said support, and a protective coating composed of depolymerized chlorinated rubber containing a powdered metallic filler, covering said metallic reflecting film, and also covering the joint between said support and said metallic reflecting film.

4. A reflecting element comprising a support of light transmitting material, a metallic silver reflecting film on a portion of said support, an intermediate coating containing a powdered metallic filler covering said reflecting film and also covering the seam between said support and said film, and a protective coating composed of depolymerized chlorinated rubber and completely covering said intermediate coating.

5. A reflecting element comprising a support of light transmitting material, a metallic silver reflecting film on a portion of said support, an intermediate coating of finely divided copper imbedded in a vehicle of shellac, covering said reflecting film and also covering the joint between said support and said reflecting film, and a protective coating composed of depolymerized chlorinated rubber and completely covering said intermediate coating.

IRVING C. MATTHEWS.